United States Patent
Shen et al.

(10) Patent No.: US 9,517,531 B2
(45) Date of Patent: Dec. 13, 2016

(54) TERMINAL ARRANGEMENT FOR VOICE COIL MOTOR

(71) Applicant: XIAMEN XINHONGZHOU PRECISION TECHNOLOGY CO., LTD., Xiamen (CN)

(72) Inventors: Wenchen Shen, Xiamen (TW); Chengyang Wu, Xiamen (TW); Shanmu Liu, Xiamen (CN); Jianlong Zhang, Xiamen (CN); Huangjie Lu, Xiamen (CN)

(73) Assignee: XIAMEN XINHONGZHOU PRECISION TECHNOLOGY CO., LTD., Xiamen, Fujian (CN)

( * ) Notice: Subject to any disclaimer, the term of this patent is extended or adjusted under 35 U.S.C. 154(b) by 289 days.

(21) Appl. No.: 14/250,271

(22) Filed: Apr. 10, 2014

(65) Prior Publication Data

US 2014/0306555 A1    Oct. 16, 2014

(30) Foreign Application Priority Data

Apr. 16, 2013    (CN) .......................... 2013 1 0131329

(51) Int. Cl.
| | |
|---|---|
| *H02K 41/02* | (2006.01) |
| *B23K 26/20* | (2014.01) |
| *H02K 41/035* | (2006.01) |
| *H01F 41/06* | (2016.01) |

(52) U.S. Cl.
CPC ............... *B23K 26/20* (2013.01); *H01F 41/06* (2013.01); *H02K 41/0356* (2013.01); *Y10T 29/49071* (2015.01)

(58) Field of Classification Search
CPC ....... H02K 41/02; H02K 41/03; H02K 41/031
USPC ................................ 310/12.16, 12.14, 12.04
See application file for complete search history.

(56) References Cited

U.S. PATENT DOCUMENTS

| | | | |
|---|---|---|---|
| 2010/0007973 A1* | 1/2010 | Sata ................... | H02K 41/0356 29/428 |
| 2012/0306294 A1* | 12/2012 | Chou ................. | H02K 41/0356 310/12.16 |
| 2013/0221765 A1* | 8/2013 | Chou ................. | H02K 41/0356 310/12.16 |

* cited by examiner

*Primary Examiner* — Michael Andrews

(57) ABSTRACT

A voice coil motor includes a coil support, a coil wound on the coil support, and two opposing lower elastic plates disposed on an upper part of the coil support. The outer edge of an upper flange of the coil support has at least two opposing protrusions which are arranged radially. The coil has a head end and a tail end which are respectively wound on the two protrusions. The two lower elastic plates are respectively connected with the coil wound on the two protrusions by welding. To prevent the head end from slanting, the lower elastic plates are mounted on the coil support through the operation of an automation apparatus to be soldered with the coil wound on the protrusions. The connection of the coil and the lower elastic plates is thus firm.

4 Claims, 4 Drawing Sheets

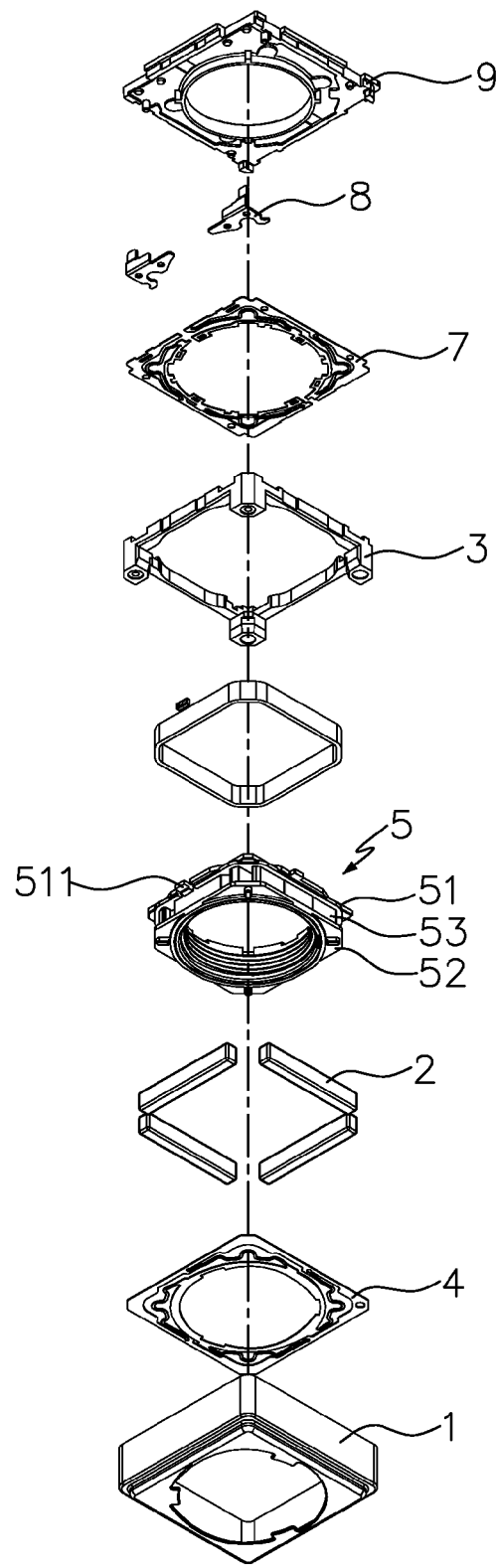
F I G. 2

TERMINAL ARRANGEMENT FOR VOICE COIL MOTOR

BACKGROUND OF THE INVENTION

1. Field of the Invention

The present invention relates to a voice coil motor, and more particularly to an arrangement of terminals for a coil and an elastic plate of a voice coil motor.

2. Description of the Prior Art

A voice coil motor is adapted to as a short-distance drive device of an electronic product, such as a cell phone, a digital camera, and the like.

A conventional voice coil motor and its assembly thereof comprises an immovable unit disposed in a casing and a movable unit which is fitted on the immovable member and is movable relative to the immovable member. The immovable unit comprises an elastic plate, a magnetic member, and a spacer to fix the magnetic member. The movable unit comprises a support and a coil wound on the support. As shown in FIG. 1, a coil 6' and an elastic plate 7' of the conventional voice coil motor are manually fixed together. After the coil 6' is wound on a support 5', the head end and the tail end of the coil, however, may slant to some degrees. It is therefore necessary to adjust the undesired slanting by drawing out the ends of the coil manually after winding in order to solder the elastic plate 7' on the support 5' manually. Therefore, the process to assemble the coil 6' and the elastic plate 7' is quite complicated and requires much more time and work for assembling. The cost in manufacture would as such increase. Besides, the welding of the ends of the coil and the elastic plate 7' occurs on a thread-surface contact. The welding area of the thread-surface is small. When the product is tested for strength or rolling, or is assembled in an electronic product, the ends of the coil may disconnect from the prior welding position. The present invention was devoted to solve this problem.

SUMMARY OF THE INVENTION

The primary object of the present invention is to provide a voice coil motor, saving the trouble in assembling a coil and elastic plates manually in a limited small area, enhancing the efficiency in production greatly and the firm connection of the coil and the elastic plates for an improved quality of the product.

In order to achieve the aforesaid object, the voice coil motor of the present invention comprises a coil support, a coil wound on the coil support, and two opposing lower elastic plates disposed on an upper part of the coil support. The coil support is a sleeve. The coil support has an upper flange and a lower flange at upper and lower ends thereof, and a support body between the upper flange and the lower flange for the coil to be wound thereon. The outer edge of the upper flange has at least two opposing protrusions which are arranged radially. The coil has a head end and a tail end which are respectively wound on the two opposing protrusions. The two lower elastic plates are respectively connected with the coil wound on the two protrusions by welding.

Preferably, the bottom of one of the protrusions is formed with a notch. The bottom of the notch is flush with the support body. The protrusion having the notch is to form a start position for the coil to be wound on the coil support.

Preferably, the coil support is a square-like sleeve. Four sides of the coil support are provided with one protrusion, respectively. The protrusions of the four sides are arranged evenly.

Preferably, the bottom of one of the protrusions is formed with a notch. The bottom of the notch is flush with the support body. The protrusion has the notch is to form a start position for the coil to be wound on the coil support.

The voice coil motor of the present invention comprises the coil support wound with the coil is provided with two opposing protrusions. When the coil is wound on the coil support, it can be first wound on one protrusion and positioned thereon to prevent the head end from slanting, and then wound around the support body. It is as such not necessary to draw out the ends of the coil manually as disclosed by the prior art. Also, the tail end is wound on the other protrusion. The process to assemble the coil and the elastic plates is simple and thus cost-effective. The lower elastic plates are mounted on the coil support through the operation of the automation apparatus to be soldered with the coil wound on the protrusions. This facilitates the welding by the automation apparatus and enhances the efficiency in production greatly. The contact area of the coil wound on the protrusions and the lower elastic plates is comparatively larger, making the connection of the coil and the lower elastic plates firm, preventing the end of coils from disconnection from the prior welding position, thereby improving the quality of the product of the voice coil motor.

BRIEF DESCRIPTION OF THE DRAWINGS

FIG. 2 is an exploded view according to a preferred embodiment of the present invention;

DETAILED DESCRIPTION OF THE PREFERRED EMBODIMENTS

Embodiments of the present invention will now be described, by way of example only, with reference to the accompanying drawings.

Figure 1:
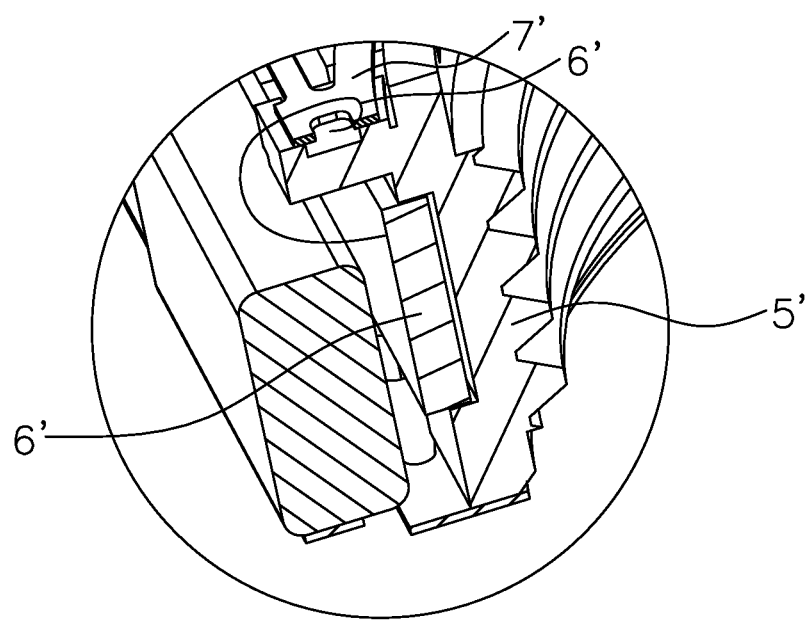
FIG. 1 is a sectional view showing the assembly of the coil and the elastic plate of a conventional voice coil motor.
Figure 3:
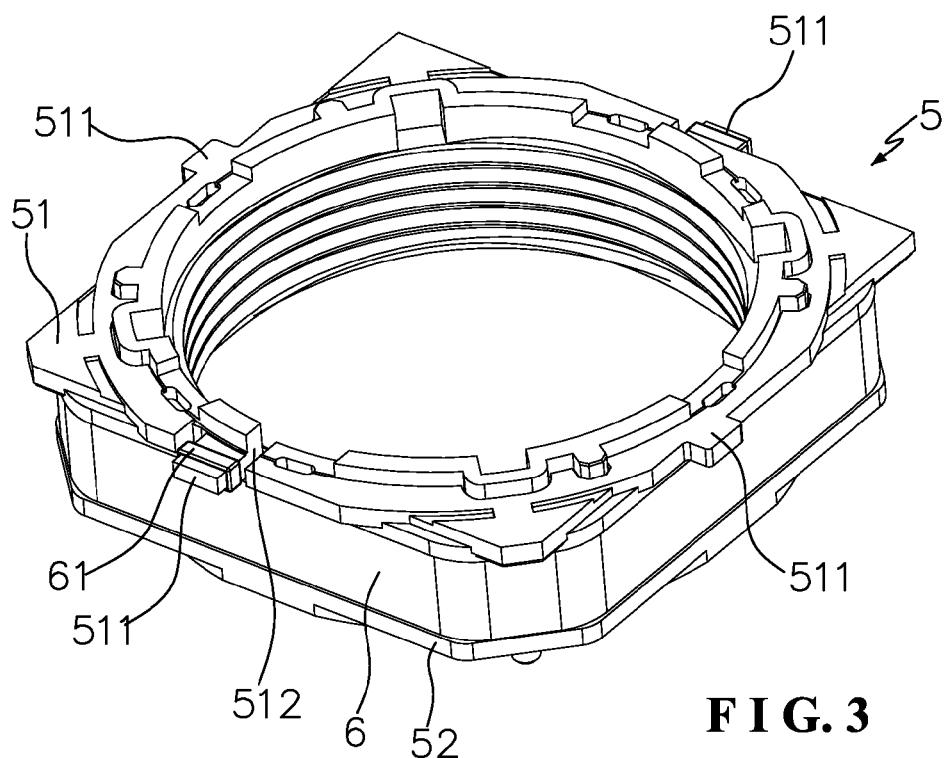
FIG. 3 is a perspective view showing the coil support according to the preferred embodiment of the present invention.
Figure 4:
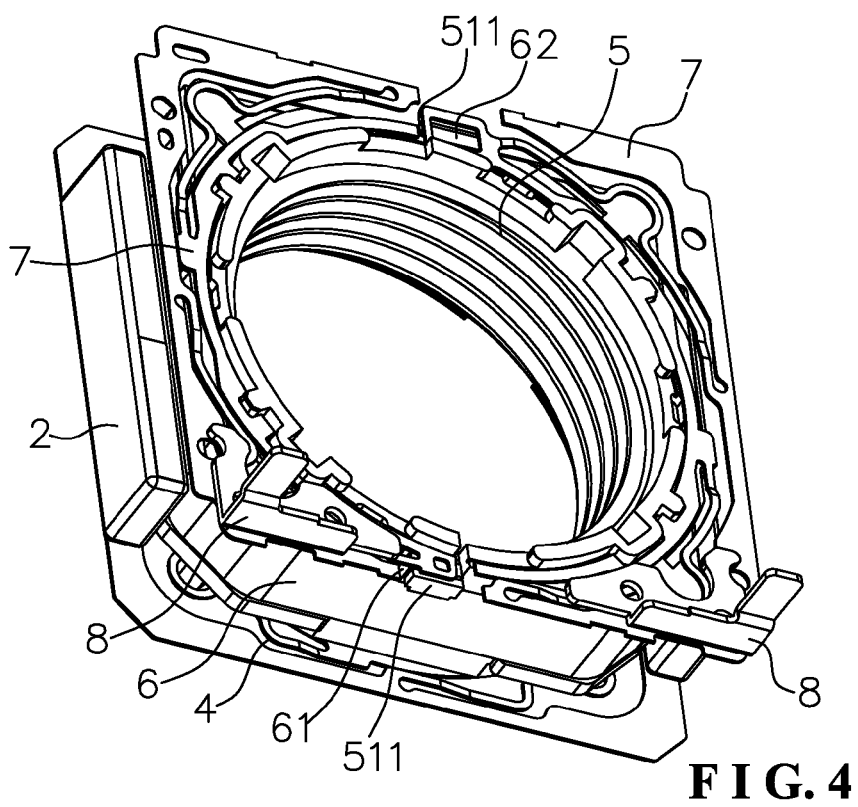
FIG. 4 is a perspective view showing the coil support and the elastic plates according to the preferred embodiment of the present invention.
Figure 5:
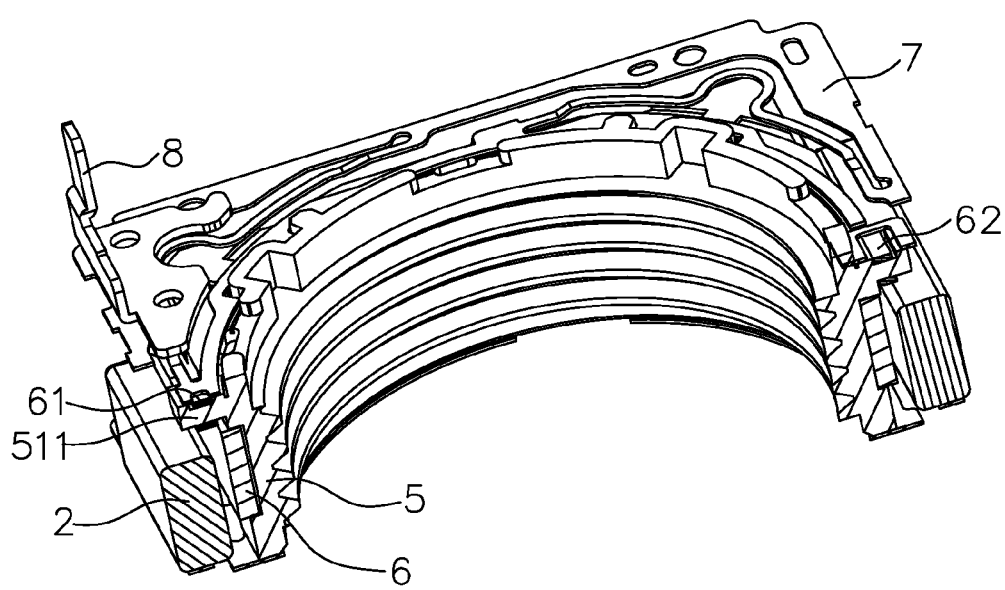
FIG. 5 is a sectional view showing the coil and the elastic plates according to the preferred embodiment of the present invention.

As shown in FIG. 2 to FIG. 5, the present invention discloses a voice coil motor. The voice coil motor according to a preferred embodiment of the present invention comprises a casing 1, a magnetic member 2, a spacer 3 to fix the magnetic member 2, an upper elastic plate 4 to match with the spacer 3, a coil support 5, a coil 6 wound on the coil support 5, and two opposing lower elastic plates 7 disposed on the coil support 5. The two lower elastic plates 7 and a terminal 8 are welded together, and then fixed on an upper cover 9. The outer wall of the upper elastic plate 4, the magnetic member 2, the spacer 3, and the outer walls of the two lower elastic plates 7 constitute an immovable unit. The coil support 5 wound with the coil 6, the inner walls of the two lower elastic plates 7, and the inner wall of the upper elastic plate 4 constitute a movable unit. The casing 1 and the upper cover 9 form a chamber to accommodate the aforesaid parts.

The coil support 5 is a sleeve which can be a square, circle, or a polygon. The coil support 5 has an upper flange 51 and a lower flange 52 at upper and lower ends thereof, and a support body 53 between the upper flange 51 and the lower flange 52 for the coil 6 to be wound thereon. The outer edge of the upper flange 51 has at least two opposing protrusions 511 which are arranged radially. The coil 6 has a head end 61 and a tail end 62 which are respectively wound on the two opposing protrusions 511. The two lower elastic plates 7 are respectively connected with the coil wound on the two protrusions 511 by welding.

In this embodiment, the coil support 5 is a square sleeve. Four sides of the coil support 5 are provided with one protrusion 511, respectively. The protrusions 511 of the four sides are arranged evenly to achieve a balance.

The bottom of one of the protrusions 511 is formed with a notch 512. The bottom of the notch 512 is flush with the support body 53. The protrusion 511 having the notch 512 is to form a start position for the coil 6 to be wound on the coil support 5. When the coil 6 is wound, the head end 61 of the coil 6 is first wound on one protrusion 511 in a loop or several loops and then positioned to prevent the head end 61 from slanting, and then wound around the support body 53. Through the notch 512, the coil 6 can tightly lean against the support body 53 when the coil 6 is wound around the support body 53 so as to ensure the tightness of the coil 6. After the coil 6 is completely wound, the tail end 62 can be wound on the other protrusion 511 opposite the protrusion 511 wound with the head end 61. The tail end 62 of the coil 6 can be wound on the other protrusion 511 in a loop or several loops to be fixed thereon.

The steps to assemble the coil and the elastic plates of the present invention are as follows:

Step 1: the coil 6 is wound on the coil support 5, and the head end 61 and the tail end 62 of the coil 6 are respectively wound on the two opposing protrusions 511 of the coil support 5;

Step 2: the coil support 5 wound with the coil 6 is installed into a mold, and the upper surface is provided with glue for fixing the lower elastic plates 7;

Step 3: the two opposing lower elastic plates 7 are installed on the upper surface of the coil support 5 through an automation apparatus, and the two opposing lower elastic plates 7 are respectively stacked on the two opposing protrusions 511 of the coil support 5 to proceed with roast and prefixing;

Step 4: the coil support 5 with the prefixed lower elastic plates 7 is taken out and placed in a welding apparatus, the contact positions of the lower elastic plates 7 and the two protrusions 511 are the contact positions of the lower elastic plates 7 and the coil 6 for proceeding with solder paste;

Step 5: the solder paste is soldered with soldering tin or fixed by laser welding to assemble the coil and the elastic plates of the voice coil motor.

The step 2 can be omitted, and then there is no need to proceed with roast in Step 2. The coil support 5 with the stacked lower elastic plates 7 is to proceed with solder paste direct.

To sum up, the voice coil motor of the present invention comprises the coil support 5 wound with the coil 6 is provided with two opposing protrusions 511. When the coil 6 is wound on the coil support 5, it can be first wound on one protrusion 511 and positioned thereon to prevent the head end 61 from slanting, and then wound around the support body 53. It is not necessary to draw out the ends of the coil manually like the prior art. Also, the tail end 62 is wound on the other protrusion 511. The process to assemble the coil and the elastic plates is simple and cost-effective. The lower elastic plates 7 are mounted on the coil support 5 through the operation of the automation apparatus to be soldered with the coil wound on the protrusions 511. This achieves the welding assembly of the automation apparatus to enhance the production efficiency greatly. The contact area of the coil wound on the protrusions 511 and the lower elastic plates 7 is large enough to ensure the firm connection of the coil and the lower elastic plates 7, avoiding the ends of the coil from disconnection from its prior welding position and improving the quality of the product of the voice coil motor.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A voice coil motor, comprising
a coil support,
a coil wound on the coil support, and
two opposing lower elastic plates disposed on an upper part of the coil support;
the coil support being a sleeve, the coil support having
an upper flange and
a lower flange at upper and lower ends thereof, and
a support body between the upper flange and the lower flange for the coil to be wound thereon,
an outer edge of the upper flange having at least two opposing protrusions which are arranged radially,
the coil having a head end and a tail end, the two lower elastic plates being respectively connected with the coil wound on the two protrusions by welding,
wherein one of the protrusions is disposed in between two terminals on a side of the upper flange and extends radially out of the upper flange with a length L, and L runs parallel to the upper flange,
wherein the head end of the coil is first wrapped around one of the protrusions in one or more loops for firm positioning the coil before the coil wound around the support body, and
the tail end of the coil is wound around another of the protrusions disposed in opposition to the one protrusion wound with the head end.

2. The voice coil motor as claimed in claim 1, wherein a bottom of one of the protrusions is formed with a notch, a bottom of the notch is flush with the support body, and the protrusion having the notch is to form a start position for the coil to be wound on the coil support.

3. The voice coil motor as claimed in claim 1, wherein the coil support is a square-like sleeve, four sides of the coil support are provided with one protrusion respectively, and the protrusions of the four sides are arranged evenly.

4. The voice coil motor as claimed in claim 3, wherein a bottom of one of the protrusions is formed with a notch, a bottom of the notch is flush with the support body, and the protrusion having the notch is to form a start position for the coil to be wound on the coil support.

* * * * *